Figure 27:
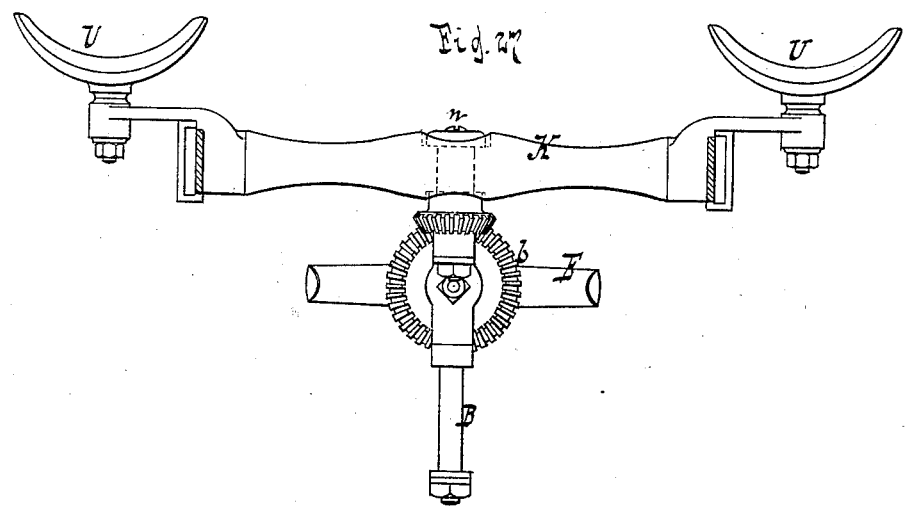

(No Model.)  9 Sheets—Sheet 1.
A. WARTH.
REIN CONTROLLER.
No. 264,803. Patented Sept. 19, 1882.
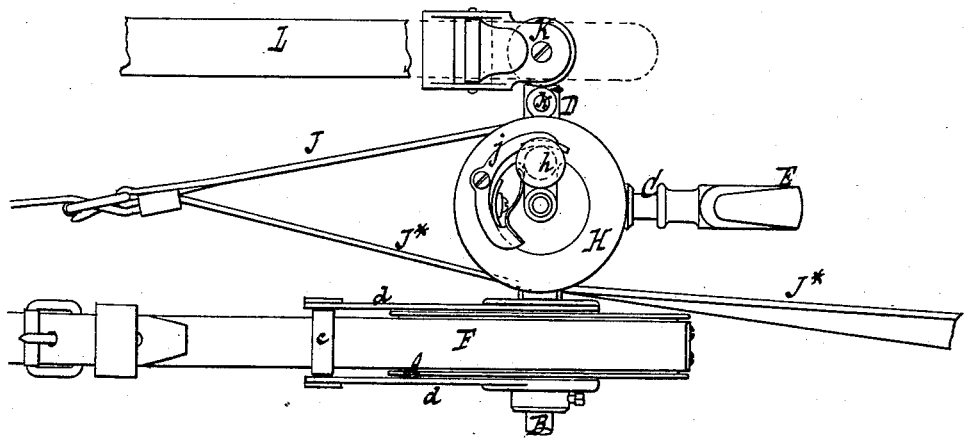
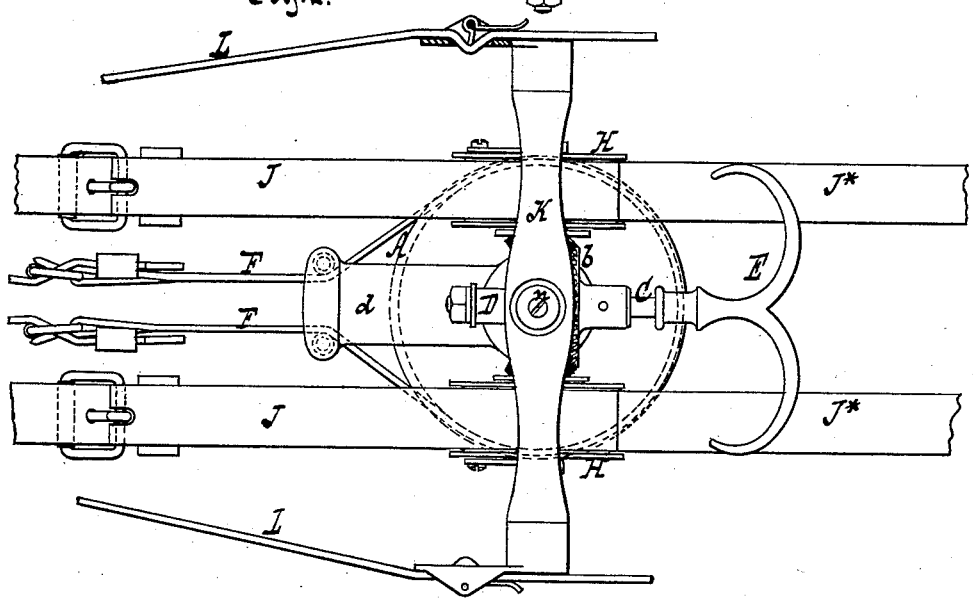
WITNESSES:
Otto Hufeland
William Miller
INVENTOR
Albin Warth.
BY Van Santvoord & Hauff
ATTORNEYS (No Model.)  
9 Sheets—Sheet 2.
A. WARTH.
REIN CONTROLLER.
No. 264,803.  Patented Sept. 19, 1882.
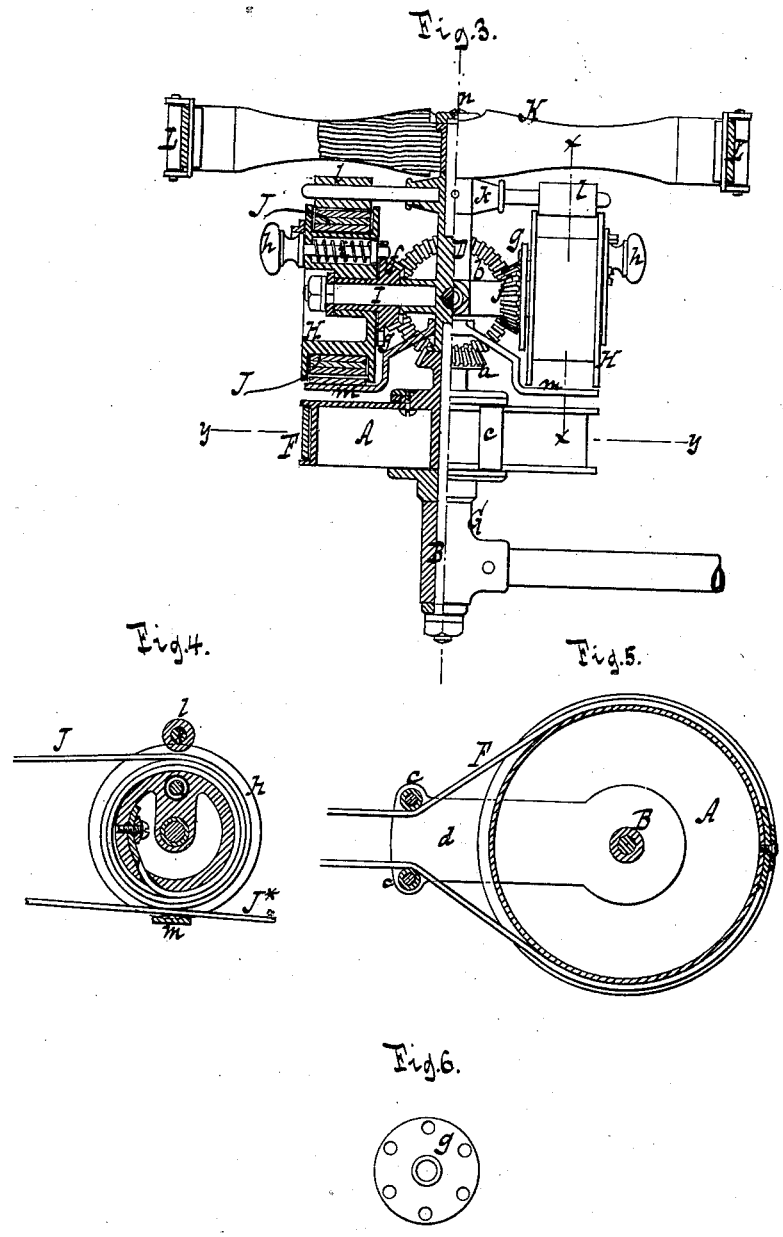
WITNESSES:
Otto Hufeland
William Miller
INVENTOR
Albin Warth
BY Van Santvoord & Hauff
ATTORNEYS (No Model.)  9 Sheets—Sheet 3.
A. WARTH.
REIN CONTROLLER.
No. 264,803. Patented Sept. 19, 1882.
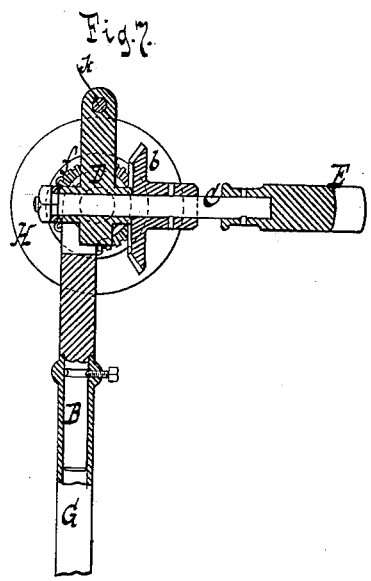
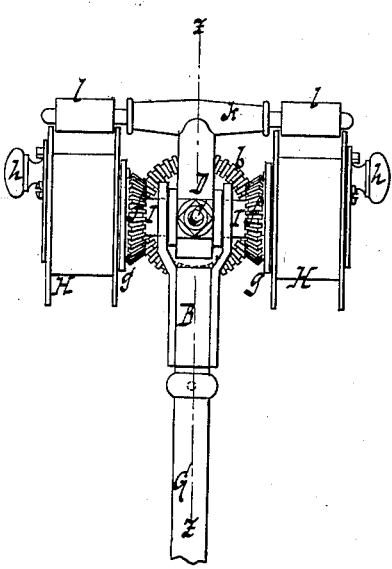
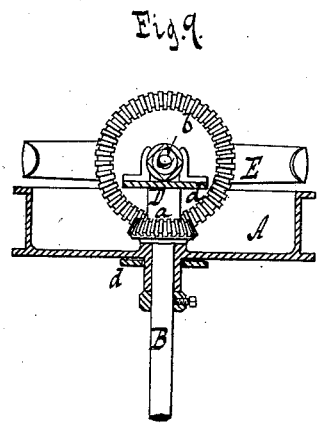
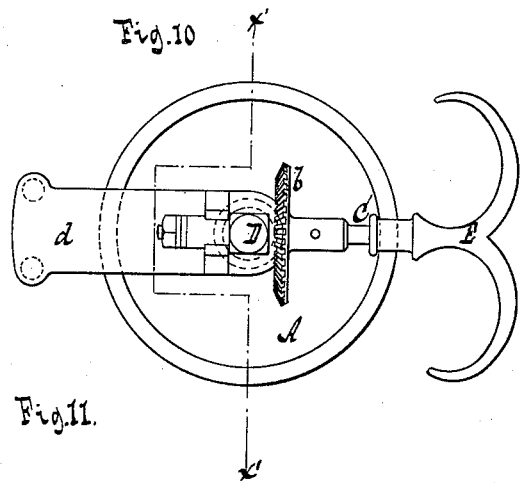
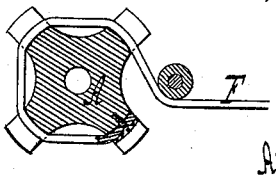
WITNESSES:
Otto Hufeland
William Miller
INVENTOR
Albin Warth
BY Van Santvoord & Hauff
ATTORNEYS (No Model.)　　　　　　　　　A. WARTH.　　　　　9 Sheets—Sheet 4.
REIN CONTROLLER.
No. 264,803.　　　　　　　　　　Patented Sept. 19, 1882.
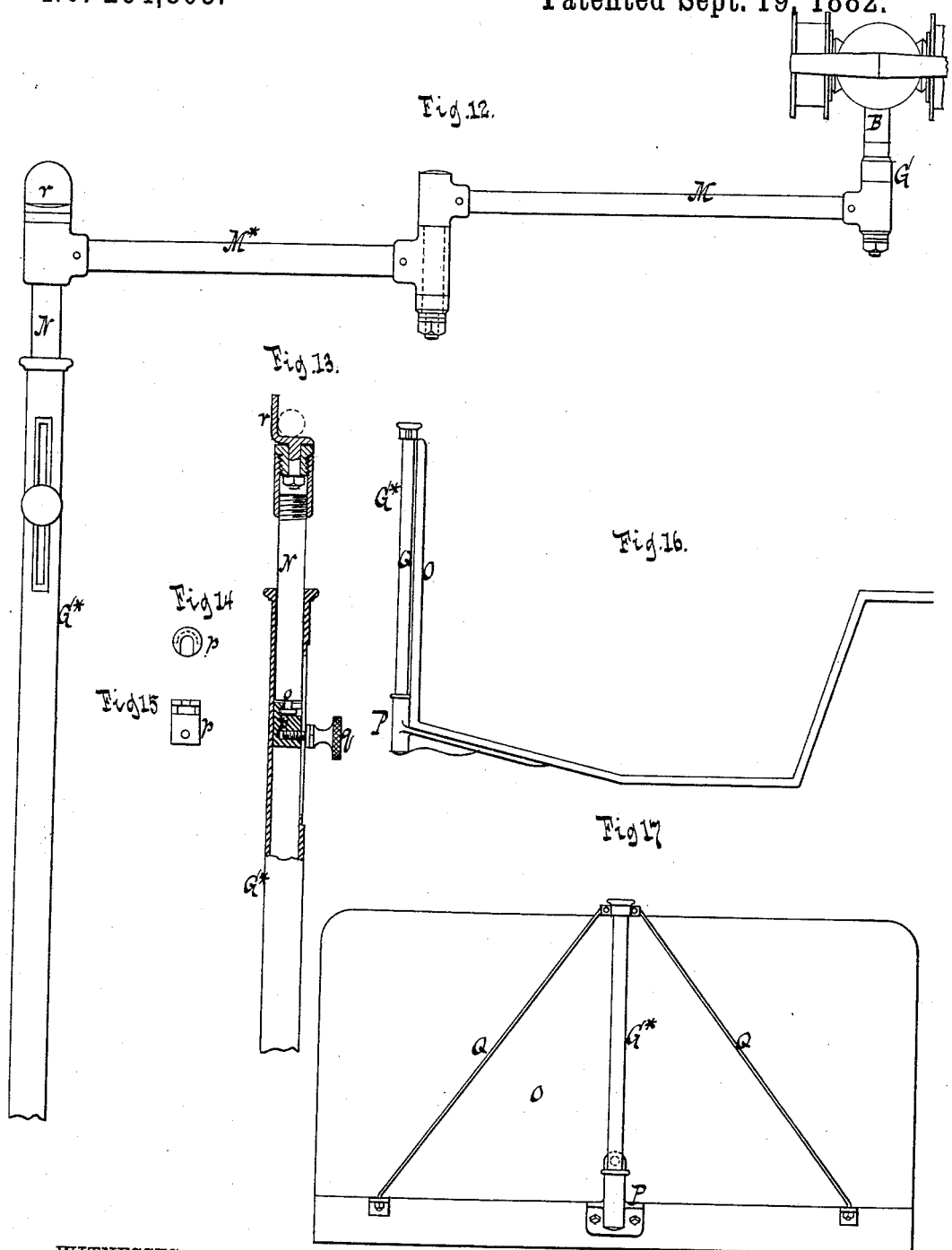

(No Model.) 9 Sheets—Sheet 5.
A. WARTH.
REIN CONTROLLER.
No. 264,803. Patented Sept. 19, 1882.
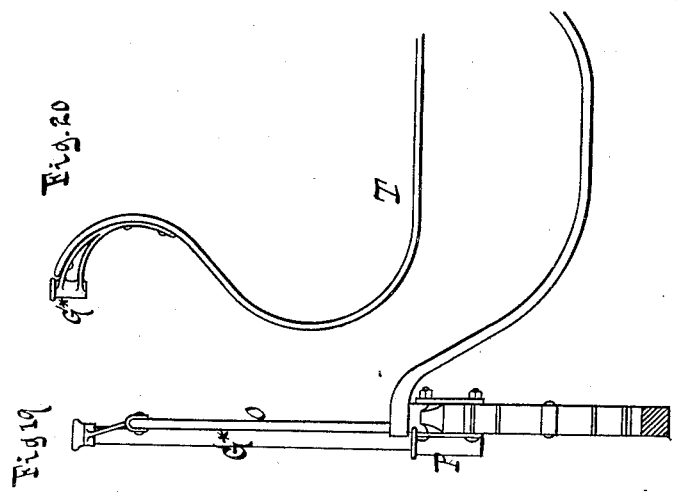
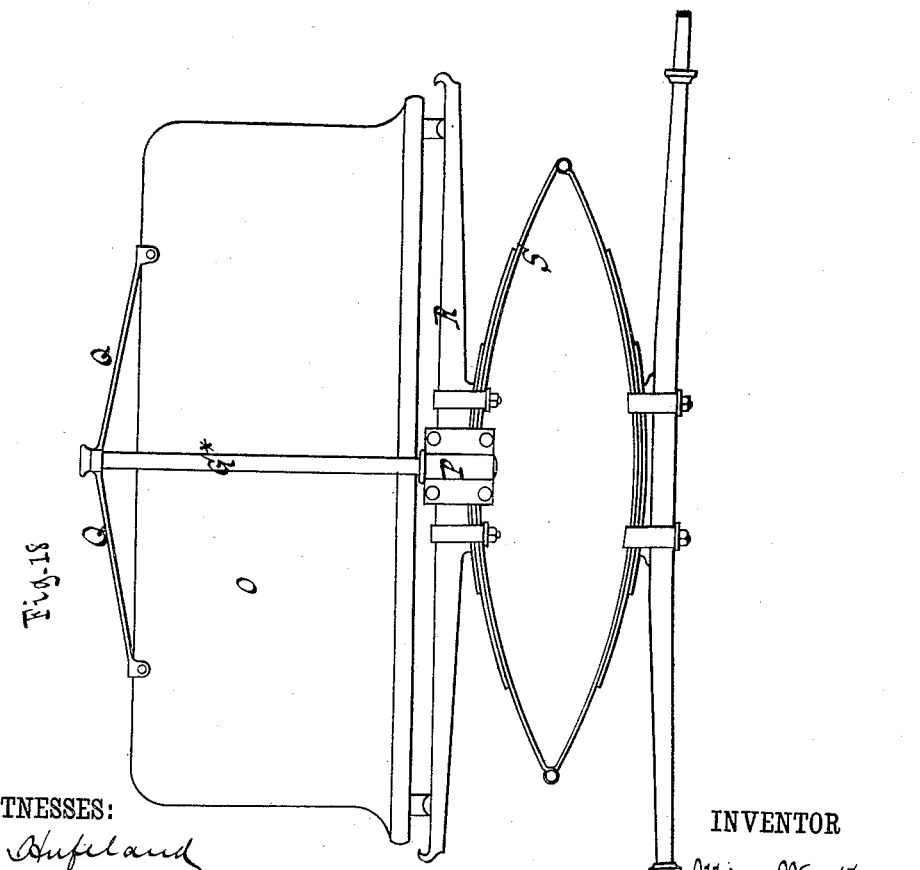
WITNESSES:
Otto Aufeland
William Miller
INVENTOR
Albin Warth
BY Van Santvoord & Hauff
ATTORNEYS (No Model.) 9 Sheets—Sheet 6.
A. WARTH.
REIN CONTROLLER.
No. 264,803. Patented Sept. 19, 1882.
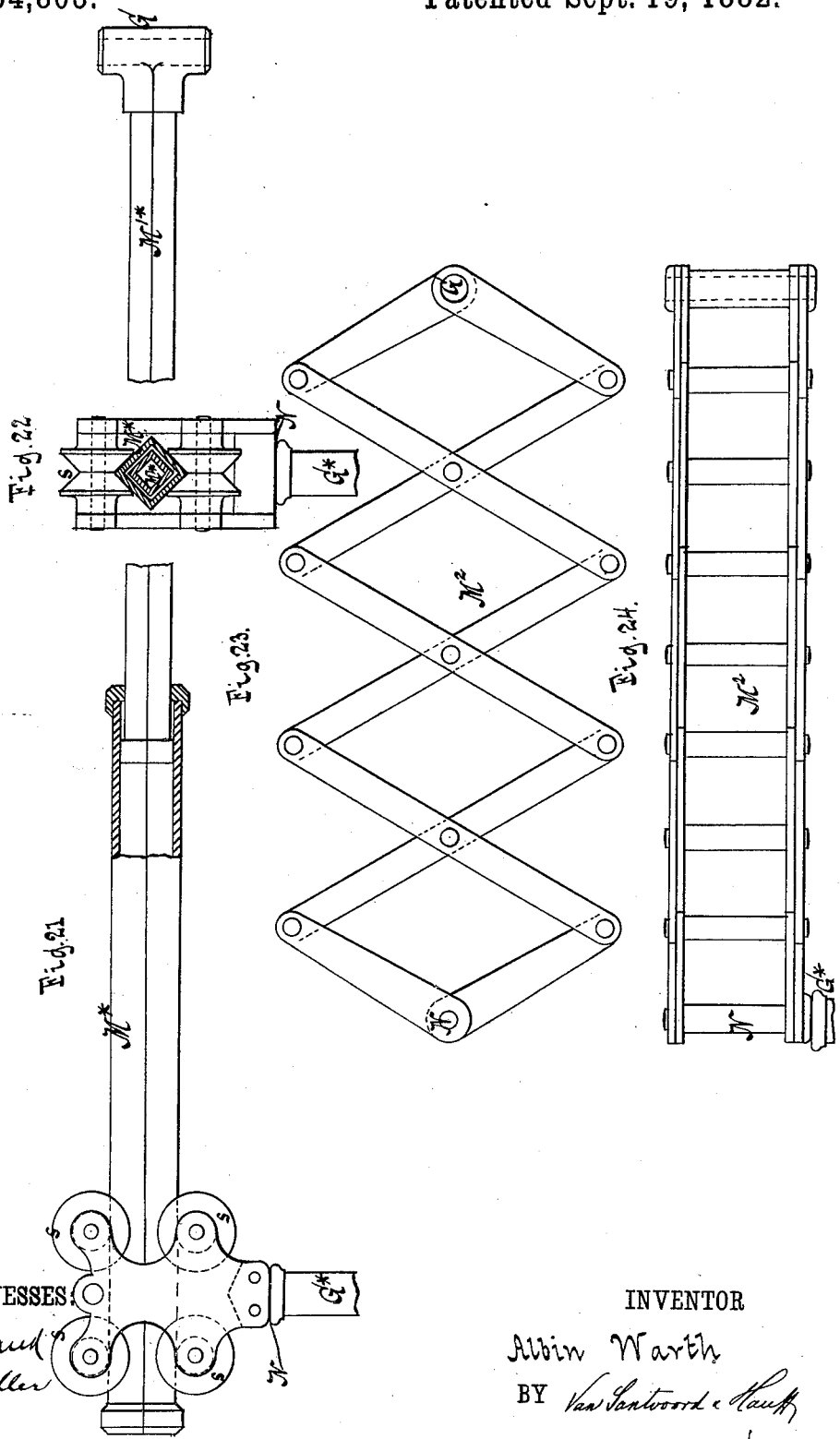
WITNESSES
INVENTOR
Albin Warth
BY Van Santvoord & Hauff
ATTORNEYS (No Model.)                9 Sheets—Sheet 7.
A. WARTH.
REIN CONTROLLER.
No. 264,803.                Patented Sept. 19, 1882.
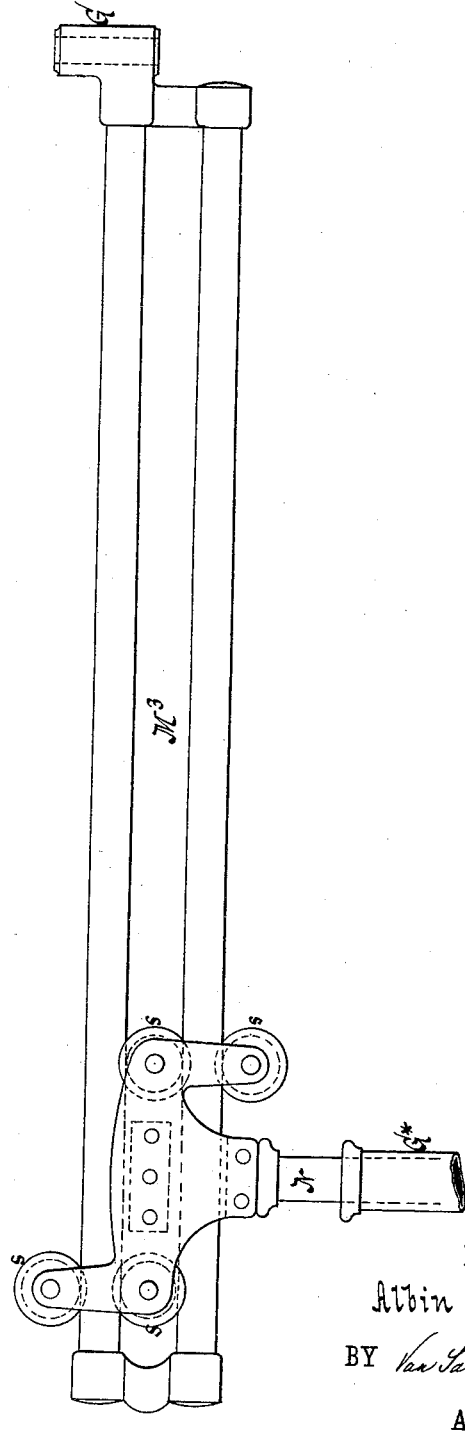

(No Model.) 9 Sheets—Sheet 8.

A. WARTH.
REIN CONTROLLER.

No. 264,803. Patented Sept. 19, 1882.

WITNESSES:
Otto Hufeland
William Miller

INVENTOR
Albin Warth
BY Van Santvoord & Hauff
ATTORNEYS (No Model.) 9 Sheets—Sheet 9.
A. WARTH.
REIN CONTROLLER.
No. 264,803. Patented Sept. 19, 1882.
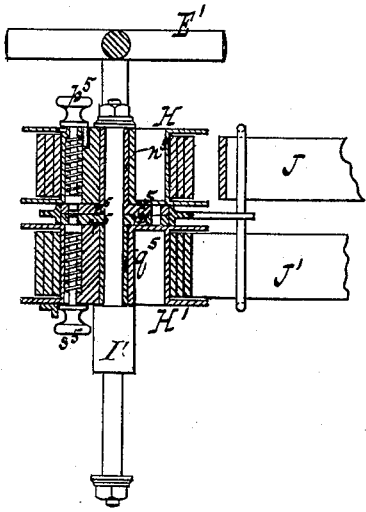
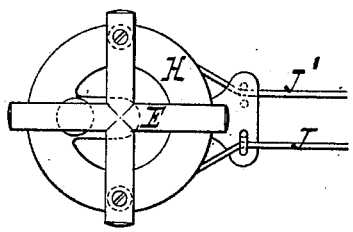
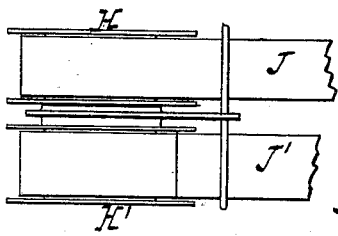
WITNESSES:
Otto Hufeland
William Miller
INVENTOR
Albin Warth
BY Van Santvoord & Hauff
ATTORNEYS

UNITED STATES PATENT OFFICE.

ALBIN WARTH, OF STAPLETON, NEW YORK.

REIN-CONTROLLER.

SPECIFICATION forming part of Letters Patent No. 264,803, dated September 19, 1882.

Application filed May 20, 1882. (No model.)

*To all whom it may concern:*

Be it known that I, ALBIN WARTH, a citizen of the United States, residing at Stapleton, in the county of Richmond and State of New York, have invented new and useful Improvements in Rein-Controllers, of which the following is a specification.

This invention relates to mechanical means for supporting the reins by which horses are driven; and it consists of certain combinations of devices, which, while supporting the reins, permit the driver to draw in one or more reins and to let out one or more other reins by turning his hand at the wrist axially with the forearm.

The invention is applicable to the control of one or more pairs of reins, and the said combinations are recited in the claims at the end of this specification.

In order that the invention may be fully understood, I have represented in the accompanying drawings, and will proceed to describe, my invention as applied to the control of three pairs of reins such as are used for driving three pairs of horses, it being understood that the mode of application of the invention may be varied according to the number of pairs of reins to be controlled and according to the views of different users or different circumstances.

In the accompanying drawings, Figure 1 represents a side elevation of my rein-controller as constructed for three pairs of horses, or what is commonly called "six-in-hand." Fig. 2 is a plan or top view of the same. Fig. 3 is a sectional front view of the same. Fig. 4 is a vertical section in the plane $x\,x$, Fig. 3. Fig. 5 is a horizontal section in the plane $y\,y$, Fig. 3. Fig. 6 is a portion of the clutch mechanism for connecting the reel to its shaft. Fig. 7 is a vertical section of my rein-holder when constructed for guiding one or two horses, the line $z\,z$, Fig. 8, indicating the plane of section. Fig. 8 is a front view of the same. Fig. 9 is a vertical section of a modification, the line $x'\,x'$, Fig. 10, indicating the plane of section. Fig. 10 is a plan or top view of the same. The remaining figures are details and modifications, which will be referred to as the description progresses.

Similar letters indicate corresponding parts.

In these drawings, the letter A designates a rein-holder, which may be made in the form of a double-flanged drum, (see Figs. 1, 3, 5, 9, and 10,) or in the shape of a cross, as shown in Fig. 11, or in any other form or shape suitable for the purpose. This rein-holder, as shown in Fig. 9, is hollow, and is mounted loosely on an upright arm, B. A bevel-wheel, $a$, is cast solid with or otherwise firmly attached to the rein-holder A, and gears into a bevel-wheel, $b$, mounted on a horizontal shaft, C, Fig. 10. This shaft has its bearings in a head, D, secured to the upper end of the upright arm B, and on its inner end is firmly mounted a handle, E. To the circumference of the rein-holder is secured, at about the middle of its length, the loop of the pair of reins F, Fig. 5, and the portions of the reins extending forward from the rein-holder are guided between rein-guides $c\,c$, which are preferably constructed as rollers, mounted between plates $d\,d$, which are connected at their outer ends by the axles of the rollers $c\,c$, while the inner end of one of said plates is secured to the head D, and the inner end of the other plate embraces the hub of the rein-holder A. The upright arm B is secured in a socket, G, Fig. 3, which is connected to the vehicle in any suitable position to bring the handle E in convenient reach of the driver, and if the driver takes hold of this handle and turns it in either direction the rein-holder A is correspondingly turned through the intervention of the connecting-gearing $a\,b$, the rein at one side of the rein-holder is drawn in, and that at the opposite side is let out, and by these means the horse or other draft-animal can be controlled.

It will be easily understood that this device can be used also for a team of two horses.

Instead of a single rein-holder, as above described, two reels, H H, may be used, as shown in Figs. 7 and 8, with the capacity to control the horse or horses, and also to shorten or lengthen either rein separately, so as to adjust its working length. These two reels H H are mounted loosely on horizontal arms I I, Fig. 8, which extend from the head D, that is mounted on the upper end of the upright arm B, and forms the bearing for the shaft C, that carries the handle E. On each of the horizontal arms I I is mounted loosely a bevel-wheel, *f*, which can be coupled to the corresponding reel H, and to the handle-shaft O is firmly secured a bevel-wheel, *b*, which gears into the bevel-wheels *f f*, Fig. 8. When the bevel-wheels *f f* are coupled together with the reels H H and the handle is turned the two reels revolve in opposite directions, drawing in one rein and letting out the other. The bevel-wheels thus constitute gearing by which the said reels are connected with the handle E.

For the purpose of coupling the bevel-wheels *f f* and the reels A A, I use plates *g*, Fig. 6, and pins *h*, Figs. 3 and 8. The plates *g* are firmly connected to the bevel-wheels *f f*, and they are provided with a number of holes, as shown in Fig. 6. The pins *h* extend through the reels and are subjected to the action of springs *i*, Fig. 3, which have a tendency to drive the same inward, so as to engage with one of the holes in the corresponding plate *g*. If one of the pins *h* is drawn out, the corresponding reel can be turned on its arm independent of the corresponding bevel-wheel *f*, for the purpose of shortening or lengthening the effective length of its particular rein; but if the pins are permitted to follow the action of their springs they engage with the plate *g* and the reels and bevel-wheels are coupled together. When one of the pins *h* has been drawn out it is retained in this position by a spring-latch, *j*. (See Fig. 1.) I do not wish to confine myself, however, to this precise coupling device, since various other coupling devices can be substituted for those shown in the drawings without departing from my invention.

To each of the reels H is secured a strap or rein, J, Figs. 1 and 2, and these reins serve to guide one or two horses. The inner ends of the reins J may be secured to the reels H H in various ways. In Fig. 4 the rein extends into the inside of the reel and is fastened by a screw. In Fig. 11 the rein is fastened by means of a screw to one of the arms of the reel. From the head D extends an arm, *k*, across the faces of the reels H H, and on each end of this arm is mounted loosely a roller, *l*, which forms a rein-guard to prevent the rein from jumping off from the reel. If the reins are made in sections, the ends of the rein-sections J* nearest the driver pass beneath the reels H, (see Figs. 1, 2, and 4,) and they rest upon rein-supports *m*, which are formed by arms extending from the head D. (Best seen in Fig. 3.) By these means these rein-sections are kept in the proper positions, and the driver is at all times enabled to grasp them if he desires to hold back one pair of horses independently of the others, or for any other purpose.

In order to make my rein-controller applicable to a team of four-in-hand, I combine the rein-holder A and the reels H H, as shown in Fig. 3, the bevel-wheel *d* on the handle-shaft being geared together by the bevel-wheel *a* with the rein-holder A and by the bevel-wheels *f f* with the reels H H. The rein F, secured to the rein-holder A, is used to guide the pole-horses, and in order to affect the leading horses in advance of the pole-horses (which is principally necessary in turning corners, but is also required to some extent whenever the team is to be directed to one side or to the other) the rein-holder A is so proportioned and geared together with the handle-shaft that it turns faster than the reels H H. For a team of six-in-hand I add the additional rein-holder K, Figs. 1, 2, and 3. This rein-holder turns freely on a pivot, *n*, secured in the upper end of the head D, and in its ends are secured the reins L for the pole-horses, while the reins J go to the middle pair and the reins F to the leading horses. The driver controls the pole-horses by operating the rein-holder K with one hand, while he controls the middle pair and the leaders by means of the handle E.

The arm B, which supports the reel or reels, is fitted into a socket, G, as already stated, and it is so arranged, by preference, that it can turn freely in this socket. (See Fig. 7.) The socket G may be connected to the vehicle in many different ways, and the arm and socket constitute the support for the rein-holder and reels above described. In Fig. 12 I have shown the socket secured to the end of an arm, M, which is jointed to a second arm, M*, and this second arm is firmly connected to rod N, which fits a socket, G*, and is so arranged that it can be turned axially in this socket, said socket being formed in the upper end of a standard which is firmly secured to the vehicle. The rod N and socket G* constitute a swivel-support for the rein-controller and its various rein-holders or reels. The rod N is provided at its lower end with a head, *o*, Fig. 13, which preferably engages with a slide, *p*, that can be adjusted in the socket G* by a set-screw, *q*. A section of this slide is shown in Fig. 13, a top view in Fig. 14, and a front view in Fig. 15. By combining this slide with the rod N said rod can be raised and lowered as well as turned axially in the socket G* without being liable to become detached. To the upper end of the rod N is secured a friction-support, *r*, so that when the arm M is swung around upon this support it is retained in position.

The socket G* may be secured to the dash-board O by means of a bracket, P, and braces Q, as shown in Figs. 16 and 17. The bracket P, instead of being secured to the bottom part of the dash-board, as shown in these figures, may be connected to the bolster R, which is supported by the spring S, as shown in Figs. 18 and 19. In applying my rein-holder to a sleigh, I secure the socket G* directly to the body of the sleigh in the manner shown in Fig. 20.

Instead of the jointed arms M M* shown in Fig. 12, various other devices may be used—such, for instance, as the telescopic bars M' M'* shown in Figs. 21 and 22, or the lazy-tongs M² shown in Figs. 23 and 24. The bar M', Figs. 21 and 22, is square, and slides between guide-rollers $s$ $s$, which are mounted in cheeks secured to the rod N, while the socket G is secured to the outer end of the bar M'*. The lazy-tongs M² are connected to the rod N, and to their outer ends is secured the socket G.

Instead of the telescopic bars M' M* shown in Figs. 21 and 22, a sliding frame, M³, may be used, such as shown in Figs. 25 and 26. This frame consists of two bars, which are connected at their ends and guided between rollers $s$ $s$, which are mounted in cheeks secured to the rod N. All these devices are mechanical equivalents for the jointed arms, for the purpose of supporting my rein-controller with the capacity of moving it to and fro. By combining either of these devices with the socket G, which supports my rein-controller, I am enabled to give to the rein-controller the requisite freedom of motion, so that the driver can easily execute all the operations requisite in driving. If the socket G is firmly attached to the vehicle, my rein-controller can be used for guiding the horse or horses; but it cannot be used for holding them back, and for this purpose the rein-sections J*, Figs. 1 and 2, must be used; but if the rein-controller is combined with the socket G or G* by jointed arms or any other equivalent mechanism, the driver can guide the horses and hold them back with much greater ease than he can do by the ordinary arrangement, because the hand (or hands) which he uses for operating my rein-controller is supported by the handle or rein-holders of the apparatus, while in the ordinary manner of operating the reins the hands are entirely unsupported and have to sustain the whole weight of the reins.

Figure 28:
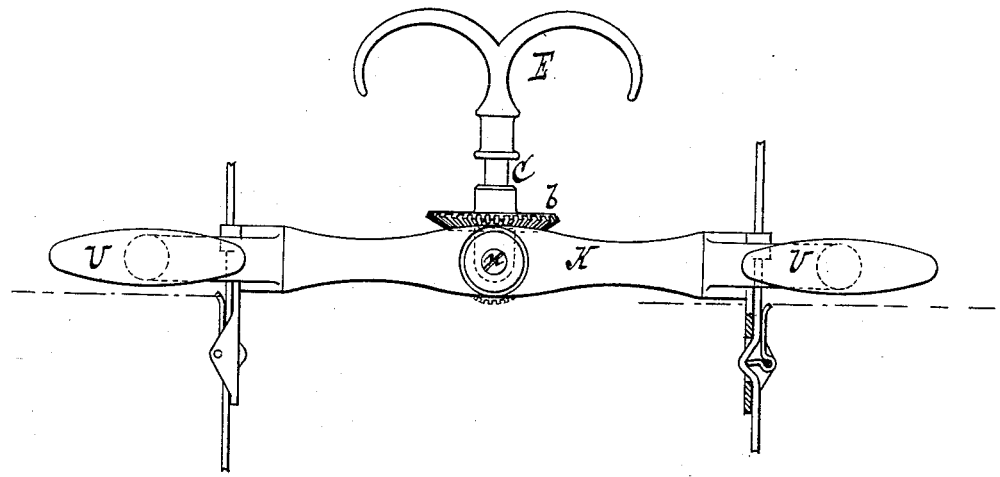

In order to make my rein-controller still more convenient, I secure to the ends of the rein-holders K arm-rests U, as shown in Figs. 27 and 28, upon which the driver may rest his arms while grasping the reins in advance of the rein-holder K in the ordinary way. The arm-rests U are fastened in the handle K, so that they can freely swivel therein.

In the above-described rein-controller the rein-holder A is made in the form of a drum; but by making it in the form of the upper rein-holder, K, and arranging it far enough from the reels H H to admit the fingers between them and it, it may be used as a handle to turn the reels, thus avoiding the necessity of using the handle E.

In the above-described rein-controller the reels are mounted upon horizontal axles; but they may be mounted, if preferred, upon upright axles, and the gearing may be correspondingly modified. For guiding the horses the reels may also be turned simultaneously in the same direction, provided the reins be wound in opposite directions upon the reels. In the latter case, also, the reels, suitably connected by clutch mechanism, may be turned directly by a handle without the interposition of gearing. An example of such a modification is represented at Figs. 29, 30, and 31, where Fig. 29 represents a vertical section; Fig. 30, a plan or top view; Fig. 31, a side view. In the example shown by these figures, the reels H H' are mounted on the vertical axle I' and the handle E' is firmly connected to one of the reels. The reins J J' are wound on the reels in opposite directions, so that if both reels are turned in the same direction one rein is drawn in and the other is paid out. The upper reel, H, is mounted on a sleeve, $n^5$, on the inner end of which is secured a disk, $o^5$, with holes to receive the clutch-pin $p^5$. The lower reel, H', is mounted on a sleeve, $q^5$, on the inner end of which is secured a disk, $r^5$, with holes to receive the clutch-pin $s^5$. The disks $o^5$ and $r^5$ are geared together by a tooth, $t^5$. When both reels are coupled together with their disks and the upper reel is turned by the handle E' one of the reins is drawn in and the other paid out. If the lower reel, H', is uncoupled, the upper reel can be turned separately.

It is obvious that the device herein described can be turned upside down or in a horizontal or inclined position, as may be most convenient, under certain circumstances.

What I claim as new, and desire to secure by Letters Patent, is—

1. The combination of a rein-holder, a projecting handle arranged to turn in its supporting-bearings, and a gear-connection between the handle and the rein-holder for transmitting a turning movement from the handle to the said rein-holder, substantially as described.

2. The combination of a rein-holding reel, a rotary handle, and a gear-connection between the handle and the reel for transmitting rotary motion from the handle to the reel, substantially as described.

3. The combination of two rein-holding reels, a handle, and a gear-connection between the handle and the two reels for transmitting rotary movement by the handle to both of the reels, substantially as described.

4. The combination, with a rein-holder, of the support for the rein-holder and jointed or swiveled arms for carrying said support, substantially as described.

5. The combination of a rein-holder, a handle, and intermediate gearing for transmitting movement from the handle to the rein-holder, with a support for the rein-holder and jointed or swiveled arms for carrying the said support, substantially as described.

6. The combination of a turning rein-holding reel, a turning-handle, and intermediate gearing between the handle and the reel, with a support for the reel and jointed arms for carrying said support, substantially as described.

7. The combination of two rein-holding reels with an intermediate handle geared together with the two reels to turn them in the same or in reverse directions, substantially as described.

8. The combination of two rein-holding reels, a handle for rotating said reels, and a clutch mechanism, whereby one reel can be rotated independently of the other, substantially as described.

9. The combination of two independent rein-holding reels, a handle, and intermediate gearing connecting the handle with both reels, and a clutch mechanism for each reel, whereby both reels can be simultaneously or independently rotated, substantially as described.

10. The combination of a rein-holder, a rotating handle-shaft, a gear on the handle-shaft, and a gear on the reel, substantially as described.

11. The combination of two rein-holding reels, each provided with a gear, and a rotating handle-shaft provided with a gear engaging the gears on the two reels, substantially as described.

12. The combination of two reels arranged to rotate on fixed bearings, the gear-wheels loosely mounted on the said bearings, the clutch-plates attached to said gear-wheels, the clutch-pins carried by the reels, and the handle-shaft interposed between the reels and provided with a gear-wheel engaging both of the gear-wheels on said reels, substantially as described.

13. In combination with the rein-holder mounted on a vertical axis, two rein-holders mounted on a horizontal axis, a handle geared to all of said holders for rotating the same, and a head supporting the said vertical and horizontal axes, substantially as described.

14. The combination of the two reels rotating in a vertical plane, a head supporting said reels, a handle-shaft arranged in bearings in gear with all of the reels, and a handle pivoted to the upper end of the said head, substantially as described.

15. The combination of the reel mounted on a vertical axis, two reels mounted on horizontal axes, a rotating handle in gear with all of the reels, a head supporting the vertical and horizontal axes of the reels, and a handle pivoted to the upper portion of the said head and provided with rests for the driver's arms, substantially as described.

16. The combination, with a vehicle, of a swivel-arm with arm-supports, substantially as described.

17. The combination, with a vehicle, of a swivel-arm with swiveling arm-supports, substantially as described.

18. The combination, with a vehicle, of a swivel-arm, arm-supports, and jointed arms, substantially as described.

In testimony whereof I have hereunto set my hand and seal in the presence of two subscribing witnesses.

ALBIN WARTH. [L. S.]

Witnesses:
  W. HAUFF,
  E. F. KASTENHUBER.